US011012527B2

(12) United States Patent
Abdel-Maguid et al.

(10) Patent No.: US 11,012,527 B2
(45) Date of Patent: *May 18, 2021

(54) MANAGING MULTIPLE PROFILES FOR A SINGLE ACCOUNT IN AN ASYNCHRONOUS MESSAGING SYSTEM

(71) Applicant: NANDBOX INC., Ottawa (CA)

(72) Inventors: Hazem Abdel-Maguid, Ottawa (CA); Abdelrahman Amer, Ottawa (CA)

(73) Assignee: NANDBOX INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,075

(22) Filed: Sep. 12, 2019

(65) Prior Publication Data
US 2020/0252479 A1  Aug. 6, 2020

Related U.S. Application Data

(63) Continuation of application No. 16/078,985, filed as application No. PCT/CA2016/051028 on Aug. 31, 2016, now Pat. No. 10,419,577.

(Continued)

(51) Int. Cl.
*H04L 29/08* (2006.01)
*H04L 12/58* (2006.01)
*H04L 29/06* (2006.01)

(52) U.S. Cl.
CPC ............ *H04L 67/306* (2013.01); *H04L 51/22* (2013.01); *H04L 51/28* (2013.01); *H04L 51/32* (2013.01); *H04L 51/10* (2013.01); *H04L 63/08* (2013.01)

(58) Field of Classification Search
CPC ....... H04L 67/306; H04L 51/32; H04L 51/22; H04L 51/28; H04L 51/34; H04L 51/36;

(Continued)

(56) References Cited

U.S. PATENT DOCUMENTS 6,820,204 B1 * 11/2004 Desai ................. G06F 21/6245
726/6
6,883,000 B1 * 4/2005 Gropper ............. G06Q 10/1093

(Continued)

FOREIGN PATENT DOCUMENTS

CN       101483534 A      7/2009
CN       101743538 A      6/2010

(Continued)

OTHER PUBLICATIONS

International Search Report dated Sep. 26, 2016 from PCT Application No. PCT/CA2016/051028 (2 pages).

(Continued)

*Primary Examiner* — Greg C Bengzon
(74) *Attorney, Agent, or Firm* — Brinks Gilson & Lione; John C. Freeman

(57) ABSTRACT

Multiple profiles are received in association with a first user account in an asynchronous messaging system. One or more of the profiles are associated with other user accounts. The associated profiles are transmitted to user clients associated with the other user accounts for storage as a local copy. The association may include inclusion in a contact list of the first user, or a contact list of the other users. The associated profiles are transmitted when messages are sent from the first account to the other user clients, or the profiles are created or updated. A public profile may include a version identifier which is updated when the public profile is updated. Updates to local copies of the public profile at other user clients may occur only when a local copy of the associated version identifier indicates that the local profile is outdated, thereby reducing network traffic.

12 Claims, 9 Drawing Sheets

Related U.S. Application Data

(60) Provisional application No. 62/301,685, filed on Mar. 1, 2016.

(58) Field of Classification Search
CPC ......... H04L 51/38; H04L 51/10; H04L 63/08; H04L 63/102; H04L 51/04; H04L 51/24; H04L 67/02; H04L 67/303; H04L 69/329; H04L 29/06; H04L 51/00; H04L 51/02; H04L 51/12; H04L 51/18; H04L 51/20; H04L 63/0442; H04L 63/0815; H04L 63/10; H04L 63/101; H04L 65/4076; H04L 67/1095; H04L 67/141; H04L 67/16; H04L 67/22; H04L 67/28; H04L 67/2819; H04L 67/325; H04L 67/327; H04L 67/40; H04L 67/42; G06Q 30/02; G06Q 50/01; G06Q 10/107; G06F 16/27; G06F 21/6218; G06F 21/6245; G06F 2221/2149; G06F 16/2379; G06F 16/248; G06F 16/256; G06F 16/904; G06F 16/951; G06F 21/335; G06F 21/41; G06F 21/45; G06F 21/604; G06F 21/6227; G06F 21/6236; G06F 21/6272; G06F 21/629; G06F 3/0482; H04W 8/18; H04W 12/04; H04W 48/10; H04W 48/16; H04W 4/02; H04W 4/08; H04W 4/16; H04W 4/206; H04W 4/21; H04W 64/00; H04W 76/40; H04W 84/12; H04W 88/08; H04M 1/274516; H04M 1/72547; H04M 1/72563; H04M 1/72577; H04M 2203/4509; H04M 3/42068; H04M 3/4211; H04M 3/42229; H04M 3/5307

See application file for complete search history.

(56) References Cited

U.S. PATENT DOCUMENTS

| | | | | |
|---|---|---|---|---|
| 7,493,368 | B2* | 2/2009 | Raverdy | G06F 21/35 709/204 |
| 7,725,405 | B2* | 5/2010 | Johnson | G06Q 10/10 705/1.1 |
| 7,725,525 | B2* | 5/2010 | Work | G06Q 10/10 709/202 |
| 7,966,369 | B1* | 6/2011 | Briere | G06F 16/248 709/204 |
| 8,271,894 | B1* | 9/2012 | Mayers | G06Q 50/01 705/319 |
| 8,332,761 | B2 | 12/2012 | Cox et al. | |
| 8,640,257 | B1* | 1/2014 | Sherrets | G06F 21/6245 726/28 |
| 9,185,063 | B1* | 11/2015 | Kumar | H04L 51/043 |
| 9,477,737 | B1* | 10/2016 | Charyk | G06F 16/27 |
| 9,542,076 | B1* | 1/2017 | Onyon | H04L 67/306 |
| 9,582,139 | B1* | 2/2017 | Tseng | G06F 3/04812 |
| 9,887,941 | B1* | 2/2018 | Guarraci | H04L 51/046 |
| 9,965,133 | B1* | 5/2018 | Lindsey | G06F 21/53 |
| 10,332,132 | B2* | 6/2019 | Briere | G06Q 50/01 |
| 10,419,577 | B2 | 9/2019 | Abdel-Maguid et al. | |
| 10,439,965 | B1* | 10/2019 | Guarraci | G06Q 30/02 |
| 2001/0025280 | A1* | 9/2001 | Mandato | H04L 51/36 |
| 2003/0131073 | A1* | 7/2003 | Lucovsky | G06F 21/335 709/219 |
| 2006/0027648 | A1* | 2/2006 | Cheah | G06Q 10/06 235/381 |
| 2007/0016630 | A1* | 1/2007 | Samji | H04L 67/1095 |
| 2007/0276795 | A1* | 11/2007 | Poulsen | G06Q 90/00 |
| 2008/0021997 | A1* | 1/2008 | Hinton | H04L 63/0815 709/225 |
| 2008/0082421 | A1* | 4/2008 | Onyon | G06Q 30/0207 705/14.19 |
| 2008/0133716 | A1* | 6/2008 | Rao | G06Q 30/08 709/220 |
| 2008/0305815 | A1* | 12/2008 | McDonough | H04M 3/42382 455/466 |
| 2009/0125321 | A1* | 5/2009 | Charlebois | G06Q 30/02 705/346 |
| 2009/0165089 | A1* | 6/2009 | Bennett | G06F 21/41 726/3 |
| 2009/0177974 | A1 | 7/2009 | Cox et al. | |
| 2009/0181653 | A1* | 7/2009 | Alharayeri | H04W 4/02 455/414.1 |
| 2010/0144318 | A1 | 6/2010 | Cable | |
| 2010/0250592 | A1* | 9/2010 | Paquet | H04L 29/12122 707/770 |
| 2010/0269158 | A1* | 10/2010 | Ehler | H04L 63/102 726/4 |
| 2011/0113084 | A1* | 5/2011 | Ramnani | H04W 4/16 709/201 |
| 2011/0208822 | A1* | 8/2011 | Rathod | G06F 16/9535 709/206 |
| 2011/0225048 | A1* | 9/2011 | Nair | G06Q 50/01 705/14.66 |
| 2011/0289011 | A1* | 11/2011 | Hull | G06Q 10/107 705/319 |
| 2012/0047152 | A1* | 2/2012 | Purdy | H04W 4/029 707/754 |
| 2012/0079045 | A1* | 3/2012 | Plotkin | H04L 51/12 709/206 |
| 2012/0084348 | A1* | 4/2012 | Lee | G06Q 30/02 709/203 |
| 2012/0084349 | A1* | 4/2012 | Lee | G06Q 30/02 709/203 |
| 2012/0095846 | A1 | 4/2012 | Leverant | |
| 2012/0109882 | A1* | 5/2012 | Bouse | G06Q 10/10 707/607 |
| 2012/0117169 | A1* | 5/2012 | Plotkin | H04L 51/36 709/206 |
| 2012/0150960 | A1* | 6/2012 | Nalawade | G06Q 30/02 709/204 |
| 2012/0254774 | A1* | 10/2012 | Patton | H04L 51/20 715/758 |
| 2013/0054701 | A1* | 2/2013 | Leeder | H04L 67/306 709/205 |
| 2013/0060868 | A1* | 3/2013 | Davis | G06Q 10/107 709/206 |
| 2013/0060869 | A1* | 3/2013 | Davis | G06Q 10/107 709/206 |
| 2013/0157626 | A1* | 6/2013 | Talwar | H04L 51/16 455/413 |
| 2013/0157699 | A1* | 6/2013 | Talwar | H04L 51/38 455/466 |
| 2013/0185285 | A1* | 7/2013 | Shuman | H04L 67/306 707/722 |
| 2013/0217365 | A1* | 8/2013 | Ramnani | H04L 67/306 455/414.1 |
| 2013/0282438 | A1* | 10/2013 | Hunter | G01S 1/02 705/7.32 |
| 2013/0298030 | A1* | 11/2013 | Nahumi | H04W 4/04 715/733 |
| 2014/0074550 | A1* | 3/2014 | Chourey | G06Q 30/02 705/7.29 |
| 2014/0075014 | A1* | 3/2014 | Chourey | G06Q 30/02 709/224 |
| 2014/0075351 | A1* | 3/2014 | Hansen | H04M 1/72547 715/765 |
| 2014/0075352 | A1* | 3/2014 | Hansen | G06F 9/4451 715/765 |
| 2014/0092813 | A1* | 4/2014 | Jaakkola | H04W 48/16 370/328 |
| 2014/0245189 | A1* | 8/2014 | Berger | H04L 67/306 715/753 |
| 2014/0279454 | A1* | 9/2014 | Raman | G06Q 30/04 705/40 |
| 2014/0344205 | A1* | 11/2014 | Luna | G06N 5/025 706/47 |

(56) References Cited

U.S. PATENT DOCUMENTS

| | | | | |
|---|---|---|---|---|
| 2015/0019273 | A1* | 1/2015 | Grosz | G06Q 50/01 705/5 |
| 2015/0058324 | A1* | 2/2015 | Kauwe | G06F 16/24575 707/722 |
| 2015/0099550 | A1* | 4/2015 | Alharayeri | H04W 4/21 455/456.3 |
| 2015/0101026 | A1* | 4/2015 | Kraus | H04W 4/21 726/4 |
| 2015/0156172 | A1* | 6/2015 | Nandi | G06Q 30/0282 713/153 |
| 2015/0186660 | A1* | 7/2015 | Sherrets | G06F 21/606 726/30 |
| 2015/0205842 | A1* | 7/2015 | Jain | G06Q 10/10 707/732 |
| 2016/0027062 | A1* | 1/2016 | Mazurov | G06Q 30/0255 705/14.54 |
| 2016/0182658 | A1* | 6/2016 | Allinson | H04L 67/306 709/224 |
| 2016/0212230 | A1* | 7/2016 | Schneider | H04L 67/22 |
| 2016/0241648 | A1* | 8/2016 | Sharpe | H04M 3/5232 |
| 2017/0093967 | A1* | 3/2017 | Grosz | H04L 51/32 |
| 2017/0118165 | A1* | 4/2017 | Kumar | G06F 16/9537 |
| 2018/0176017 | A1* | 6/2018 | Rodriguez | H04L 63/08 |
| 2019/0312833 | A1* | 10/2019 | Le Jouan | H04W 12/00502 |
| 2020/0119921 | A1* | 4/2020 | Rodriguez | H04L 9/0822 |

FOREIGN PATENT DOCUMENTS

| | | |
|---|---|---|
| CN | 103797887 A | 5/2014 |
| CN | 103988223 A | 8/2014 |
| CN | 104679812 A | 6/2015 |
| JP | 2002-082990 A | 3/2002 |
| JP | 2002-108904 A | 4/2002 |
| JP | 2003-006204 A | 1/2003 |
| JP | 2004-164166 A | 6/2004 |
| JP | 2013-012164 A | 1/2013 |
| JP | 2014-170382 A | 9/2014 |
| JP | 2014526184 A | 10/2014 |
| TW | 200419380 A | 10/2004 |

OTHER PUBLICATIONS

Written Opinion of the international Searching Authority dated Sep. 26, 2016 from PCT Application No. PCT/CA2016/051028 (5 pages).
International Preliminary Report on Patentability dated May 25, 2018 from PCT Application No. PCT/CA2016/051028 (16 pages).
First Office Action dated Apr. 3, 2019 from corresponding Chinese Patent Application CN 201680085305.4 (25 pages including English translation).
Notification of Reasons for Rejection dated Mar. 19, 2019 from corresponding Japanese Patent Application 2018-557129 (9 pages including English translation).
Office Action dated Apr. 15, 2019 (9 pages including English translation) from corresponding Korean Patent Application 10-2018-7028221.
Second OA dated Dec. 26, 2019 from corresponding Chinese Patent Application CN 201680085305.4 (3 pages—no translation).
Extended European Search Report dated Jul. 26, 2019 (13 pages) from corresponding European Patent Application No. 16891916.5.
Office Action dated Sep. 17, 2019 (8 pages including English translation) from corresponding Japanese Patent Application No. 2018-557129.
Notice of Allowance (5 pages—no translation) dated Feb. 1, 2020 from Korean Application No. 10-2018-7028221.
Non-Final Office Action dated Jan. 23, 2019 (25 pages) from corresponding U.S. Appl. No. 16/078,985 (now U.S. Pat. No. 10,419,577 issued Sep. 17, 2019).
Notice of Allowance dated May 9, 2019 (16 pages) from corresponding U.S. Appl. No. 16/078,985 (now U.S. Pat. No. 10,419,577 issued Sep. 17, 2019).
Corrected Notice of Allowability dated Jul. 15, 2019 (3 pages) from corresponding U.S. Appl. No. 16/078,985 (now U.S. Pat. No. 10,419,577 issued Sep. 17, 2019).
European Patent Application No. 16891916.5, Office Action (12 pages) dated May 6, 2020.
Japanese Patent Application No. JP2018-557129, Decision of Rejection (8 pages—English translation) dated May 26, 2020.
European Patent Application No. 16891916.5, Communication Pursuant to Article 94(3) EPC (8 pages) dated Dec. 18, 2020.

* cited by examiner

MANAGING MULTIPLE PROFILES FOR A SINGLE ACCOUNT IN AN ASYNCHRONOUS MESSAGING SYSTEM

This application is a continuation patent application of U.S. patent application Ser. No. 16/078,985, filed on Aug. 22, 2018 (now U.S. Pat. No. 10,419,577, which is a National Stage application of International Application No. PCT/CA2016/051028, filed Aug. 31, 2016, the entire contents of each of which are incorporated herein by reference, and wherein U.S. patent application Ser. No. 16/078,985, filed on Aug. 22, 2018 (now U.S. Pat. No. 10,41,577), claims the benefit of priority under 35 U.S.C. § 119(e)(1) of U.S. Provisional Application Ser. No. 62/301,685, filed Mar. 1, 2016, the entire contents of which are incorporated herein by reference.

FIELD

The present disclosure relates generally to asynchronous messaging over computer networks.

BACKGROUND

Asynchronous communication is the exchange of messages, such as among devices in a communications network, by reading and responding as their schedules permit rather than according to some clock that is synchronized for both the sender and receiver. In an asynchronous messaging environment, the communication takes place between two or more applications, devices, or systems, whereby the system places a message in a message queue and does not need to wait for a reply to continue processing, and both the sender and receiver need not be available or online at the same time, but rather, read and respond as their schedules and desires permit. Examples include email, discussion chats, and forums, and text messaging over cell phones. The message delivery and response can be in seconds, minutes, or days depending on when the receiver becomes online. This is more convenient for the sender and receiver since they are not required to be online at the same time.

In modern messaging applications for cell phones, the asynchronous communication method is often adapted to transmit textual data, upload and download multimedia for speed, and to support higher numbers of concurrent user access. Modern asynchronous messaging applications commonly employ asynchronous communication protocols such as the WebSocket protocol, a bidirectional protocol with no predefined message pattern such as request/response. The WebSocket protocol allows both the client and server to send messages without waiting for each other and therefore supports full-duplex, true asynchronous communication, increasing scalability and building a near real time interactive application. Examples of asynchronous messaging applications known in the art include the WhatsApp™ messenger, the Telegram™ messenger, the Line™ messenger, the WeChat™ messenger, the Facebook™ messenger, and the Google Hangouts™ messenger. WhatsApp™ is a trademark of WhatsApp Inc. Mountain View, Calif., United States. Telegram™ is a trademark of Telegram LLC in Wilmington, Del., United eStates. Line™ is a trademark of LINE CORPORATION, Tokyo, Japan. Google Hangout™ is developed by GOOGLE, INC. in Mountain View, Calif., United States.

Modern messaging applications also sometimes support a synchronous communication method when the messaging application offers voice calls or video calls where synchronous communication is used to transmit voice or video data. Synchronous messaging or direct communication is when communication takes place between two or more applications, devices or systems, where the system places a message in a message queue and then waits for a message response before it continues processing. The information is synchronized using a clock signal and all parties involved in the communication must be present at the same time. Telephone conversations, video conferencing, and instant messaging are examples of the use of synchronous messaging where the data transmission happens in real time and requires both sender and receiver parties to be available and online at the same time while the data transmission occurs. Some embodiments of synchronous conferencing include what is sometimes called online chatting, which is sometimes extended to include audio/video conferencing or instant messaging that provides text based messaging for multi-user online chat. Examples of synchronous conferencing protocols include Internet Relay Chat (IRC), Protocol for Synchronous Conferencing (PSYC), Secure Internet Live Conferencing protocol (SILC), Extensible Messaging Presence Protocol (XMPP), and SIP for Instant Messaging and Presence Leveraging Extensions Protocol (SIMPLE).

In typical asynchronous messaging applications, the sender user sends a message to a user or plurality of receiver users, and the message request includes the message body and the receiver user identification or plurality of users' identifications. The message is transmitted to a server computer which stores and forwards the message to the receiver users when the receiver users become available. The message could be textual data, multimedia such as image, audio, and/or video. It is common for each user to have a profile containing identity information about the user. The profile may contain a name, short description, and image known as avatar. The profile may be transmitted to the other users of the asynchronous messaging system prior or near to the message transmission. The other users may view the user profile from time to time.

Also common in asynchronous messaging systems, a user registers and creates a profile at the time of registration and the system reads all user contacts and forwards the user profile to registered user contacts. The registered user contacts receive the user profile and store it locally in a memory or storage of a user device or computer associated with the user. When the user sends a message to other users, the other users receive the message and the asynchronous messaging client displays the sender user profile which is stored on the receiver user local device or computer memory along with the content of the message. As the nature of the system is asynchronous, there is no guarantee that the user profile will be sent and available at the receiver users device prior to the content of the message transmission, therefore a subset of the sender user profile may be transmitted along with the message until the sender user profile is completely transmitted.

It is also common in asynchronous messaging systems that a user may designate different classifications for contacts, such as personal contacts, professional contacts, and other unclassified contacts. Known asynchronous messaging systems generally enable a user to create only a single profile, however, which is ultimately sent to all contacts of the user.

In such systems, it is also common that the user may update the profile from time to time. As soon as the update is completed the asynchronous messaging client may send the updated profile to the server and the server may store and forward the updated profile to other users when they become available.

One difficulty arising from the implementations of user profiles in known asynchronous messaging systems is that the content a user may wish to include in his profile and which may be suitable for viewing by other users in some of the classifications of his contacts—for example, personal information, where the contact is classified as a friend or family member—but may not wish the content to be viewable by other users in other classifications of his contacts— for example, professional contacts such as an employer, an employee, or a customer. The user must therefore choose between compromising his privacy preference in order to include the content, or censoring his own profile.

Another difficulty resulting from profile updates relates to the use of user groups. Many asynchronous messaging systems allow the user to send a message to a plurality of users. Typically the plurality of users may be assigned or invited to join a group, whose identification is stored along with the assigned users' identifications at the server computer. When the message is transmitted to a specific group identification, the message is received by the server computer and the server computer stores and forwards the message to the group's assigned users when they are available. The widespread use of the asynchronous messaging applications makes it necessary for the system to adapt to larger group sizes (on the order of thousands of users) at which time profile updates become a challenge.

Some synchronous conferencing systems adopt or employ multiple profiles. For example, U.S. Pat. No. 8,332,761, the contents of which are incorporated herein by reference, discloses a synchronous conferencing system to manage multiple profiles where both sender and receiver parties must login to a synchronous conference server to obtain connection information and where each of the sender and receiver parties can exchange messages and profiles directly and must be online. The problem with this arrangement is that it provides no solution for asynchronous messaging systems where both sender user and receiver users are not required to be online and interact independently.

There would be value, therefore, in a solution that overcomes the above-mentioned limitations of known techniques and which provides and enables multiple user profiles in an asynchronous messaging environment.

BRIEF DESCRIPTION OF THE DRAWINGS

Embodiments will now be described, by way of example only, with reference to the attached Figures.

Figure 1:
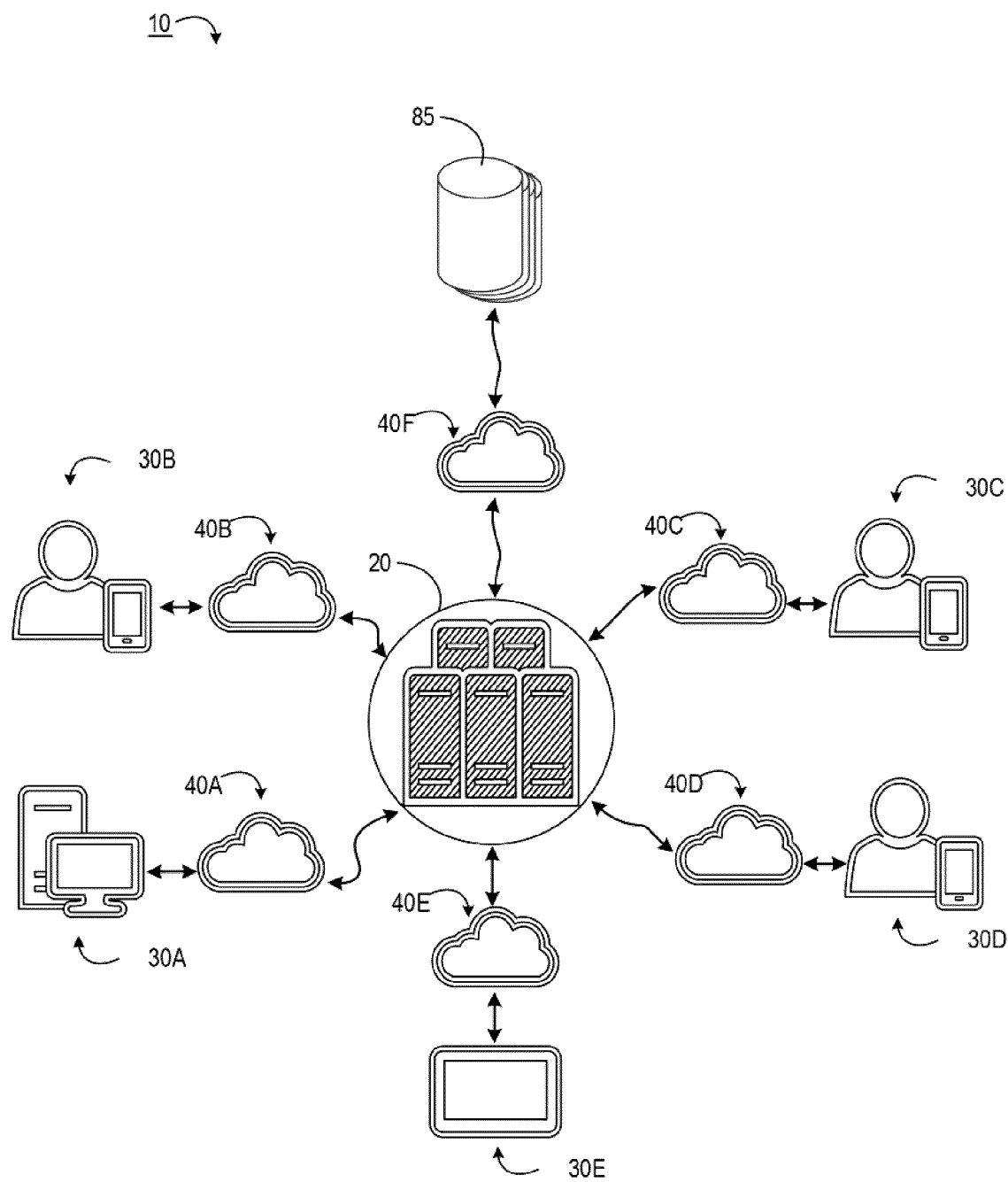
FIG. 1 is a block diagram of a system for asynchronous messaging system including an environment in which the system can be used.

In the drawings, features or elements are generally identified using reference characters comprising numerals (e.g. "10"). Reference characters comprising a numeral followed by one or more letters (e.g. "10A" or "10B") are intended to designate a particular instance of a feature or element designated more broadly by the numeral alone (e.g. "10A" or "10B" designate particular instances of feature or element "10"), and thus any characteristics ascribed to such particular instances, when referenced as such, are not necessarily possessed by all instances of the more general feature or element.

DESCRIPTION

Techniques for managing multiple profiles within a single account in an asynchronous messaging environment are disclosed herein. The techniques provide a user with control over the content of the multiple profiles and their intended recipients. The techniques address the technical difficulties associated with the propagation of updates to profiles in asynchronous messaging systems which may have a very large number of users, including very large numbers of users in user groups, and moreover where the system involves distribution of the service over a plurality of servers distributed geographically. The techniques can be implemented in numerous ways and in numerous forms.

FIG. 1 is a schematic representation of an asynchronous messaging system 10 including an environment in which the system can be used. The system 10 comprises an asynchronous messaging server 20 (or simply, "server"), one or more asynchronous messaging clients 30 (or simply, "clients"), one or more computer networks 40, any of which may include the Internet, wherein messages and message instructions can be sent over communication links, which may be wired links such as optical or electronic communications links, or wireless links. The system may comprise of one or more asynchronous messaging clients 30 which may include any appropriate type and form of user device, whether mobile or fixed, having a hardware processor and memory, and a communications interface for interfacing a communications network, the memory storing instructions executable by the processor to perform the functions described herein. Asynchronous messaging clients 30 may include for example computer asynchronous messaging clients 30A, cellular telephone or smartphone messaging clients 30B, 30C, 30D, and device tablet asynchronous messaging clients 30E. It will be understood, however, that other types and numbers of asynchronous messaging clients and other configurations are possible.

The asynchronous messaging server 20 may be configured to perform centralized asynchronous functions such as receiving, storing, and forwarding asynchronous messages and message instructions from and to asynchronous messaging clients 30 via wired or wireless links via networks 40. The asynchronous messaging server 20 may comprise a single server or a plurality of servers collocated or distributed logically or physically, including geographically, and configured to communicate via links over networks 40 to provide the functionality described herein. Each of the one or more servers may comprise a hardware processor for executing the asynchronous messaging and message instructions stored in a memory using one or more communications interfaces, and may further interface directly or indirectly one or more computer-readable storage mediums, such as databases 85, which may be connected to the server 20 directly or via networks 40, wherein one or more of the computer-readable storage mediums which may store a database structure containing various data and information for asynchronous accounts. The asynchronous messaging server 20 may store in the databases 85 an association between each asynchronous messaging client 30 and a corresponding asynchronous user account, which may be a one-to-one or a many-to-one correspondence.

Each asynchronous messaging client 30 may be configured to perform asynchronous messaging functions such as displaying contacts, establishing communication sessions to the asynchronous messaging server 20, and exchanging messaging and messaging instructions with the asynchronous messaging server 20. The asynchronous messaging client 30 may provide a user interface for sending and receiving messages to and from the contact list. The user of the asynchronous messaging client 30 may select an asynchronous messaging account from the contact list (a receiver client) to start a messaging chat. The asynchronous messaging client 30 may send the message and message instruction to the asynchronous messaging server 20. The asynchronous messaging server 20 may evaluate the availability of the receiver client to deliver the message. If the receiver client is online and connected, the asynchronous messaging server 20 may push the message to the receiver client, otherwise the asynchronous messaging server 20 may store the message on a computer readable storage medium until it is delivered to the receiver client 30 when the receiver client 30 becomes available. Particularly, the asynchronous message server 20 may expire and drop the message, if the receiver client 30 is does not become available for a period of time.

Figure 2:
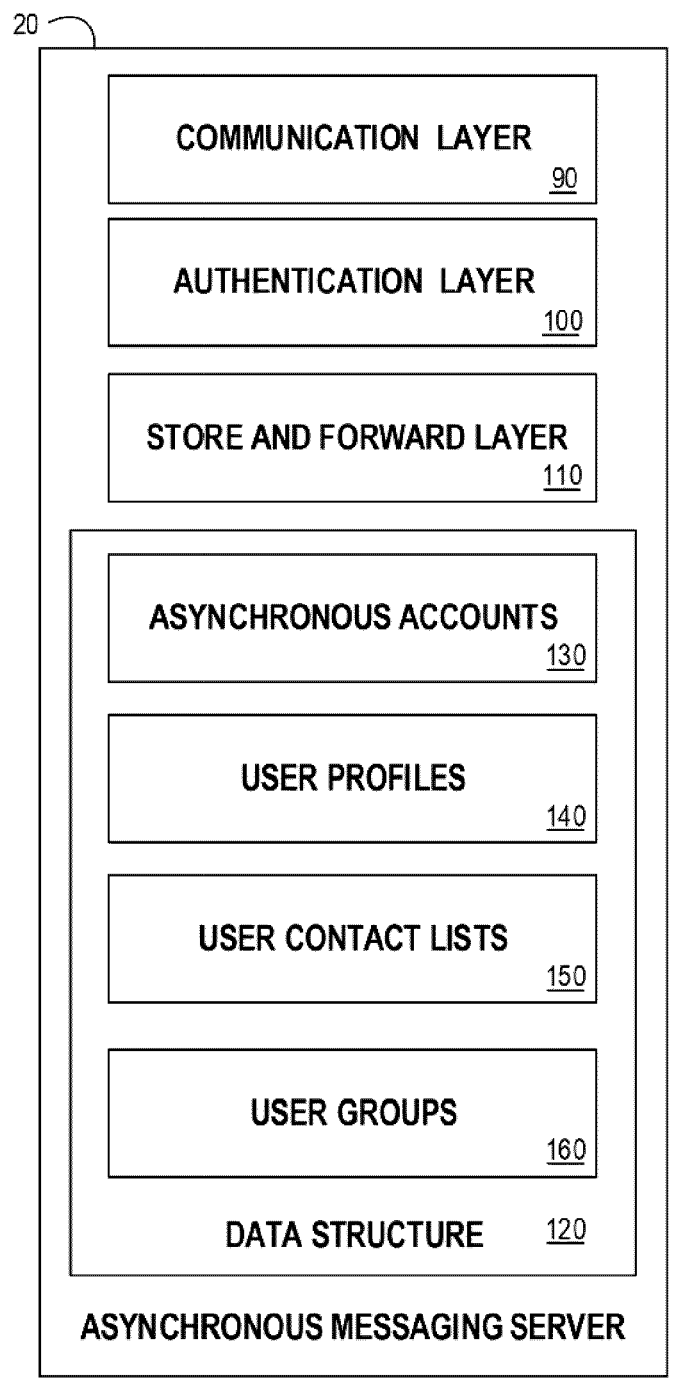
FIG. 2 is a block diagram of an asynchronous messaging server for an asynchronous messaging system.

FIG. 2 shows a block diagram illustrating schematically configuration of an asynchronous messaging server 20 used for implementing multiple profiles within an asynchronous messaging system 10. The server 20 includes a communication layer 90, an authentication layer 100, a store and forward layer 110, and a data structure 120. Each of these components may be implemented in any suitable way, using any appropriate combination of hardware and software applicable to the context of application. In general, each of the communication layer 90, authentication 100, and storage and forward layer 110, will include hardware and/or software which includes or interfaces with the aforementioned hardware processor, memory, and/or one or more communications interfaces of the server 20. Various techniques may be used for implementing the data structure 120 including databases, data storage, repositories, and other types of data structures. As noted above, the data structure 120 may be implemented at the server 20 in a computer-readable storage medium local to the server or alternatively at one or more databases 85 accessible by the server 20.

The data structure 120 may contain various data and information for multiple profiles for each asynchronous user account in the system 10. The data structure 120 may include columns for identifying and segmenting data. Each asynchronous account may hold the identification settings and data related to the configuration of the user's profile data information. Profile information may include images, such as avatars, animated images, description text, free text, sounds, audio, video, and/or other types of media. The data structure 120 may contain one or more of: a plurality of asynchronous accounts 130 which may be stored in an account database, a plurality of user profiles 140 which may be stored in a profile database, a plurality of user contact lists 150 which may be stored in a contacts database, and a plurality of user account group definitions 160 which may be stored in a groups database. A user account group may be a list composed of a plurality of user accounts that join a group discussion with a common interest. The user account group list definitions may be stored in a group list database.

The asynchronous messaging clients 30 may establish communication with the asynchronous messaging server 20 at the communication layer 90 and provide their authentication credentials. The communication between clients 30 and the server 20 may use an asynchronous protocol. Upon establishing communication, the asynchronous messaging server 20 may look-up the user account information in the asynchronous accounts 130 of the data structure 120 and match the user asynchronous messaging client credentials at the authentication layer 100. As soon as the asynchronous messaging client 30 is authenticated by the asynchronous messaging server 20, the asynchronous messaging client 30 may start sending and receiving messages and message instructions that are handled at the store and forward layer 110. Both the store and forward layer 110 and the authentication layer 100 may have access to the database structure 120 for inquiry and update.

The accounts database 130 may have an asynchronous account identifier as a primary key as well as other user data such as a secret PIN, an MSISDN, a push notification identifier, and a device identifier that may identify the client device. The profiles database 140 may have a profile identifier and an account identifier as a composite primary key, allowing for a plurality of profiles to be defined for each user account, as well as other information such as a profile name, short description, and an image known as an avatar. The contacts database 150 may define a relation between two user accounts; it may contain a composite key of the two user account identifiers, and a profile identifier for the first user account. The groups database 160 may have a group identifier as primary key, a group name, a short description, and an image known as a group avatar. The groups database 160 may have a group identifier as a first foreign key and an account identifier as a second foreign key.

Figure 3:
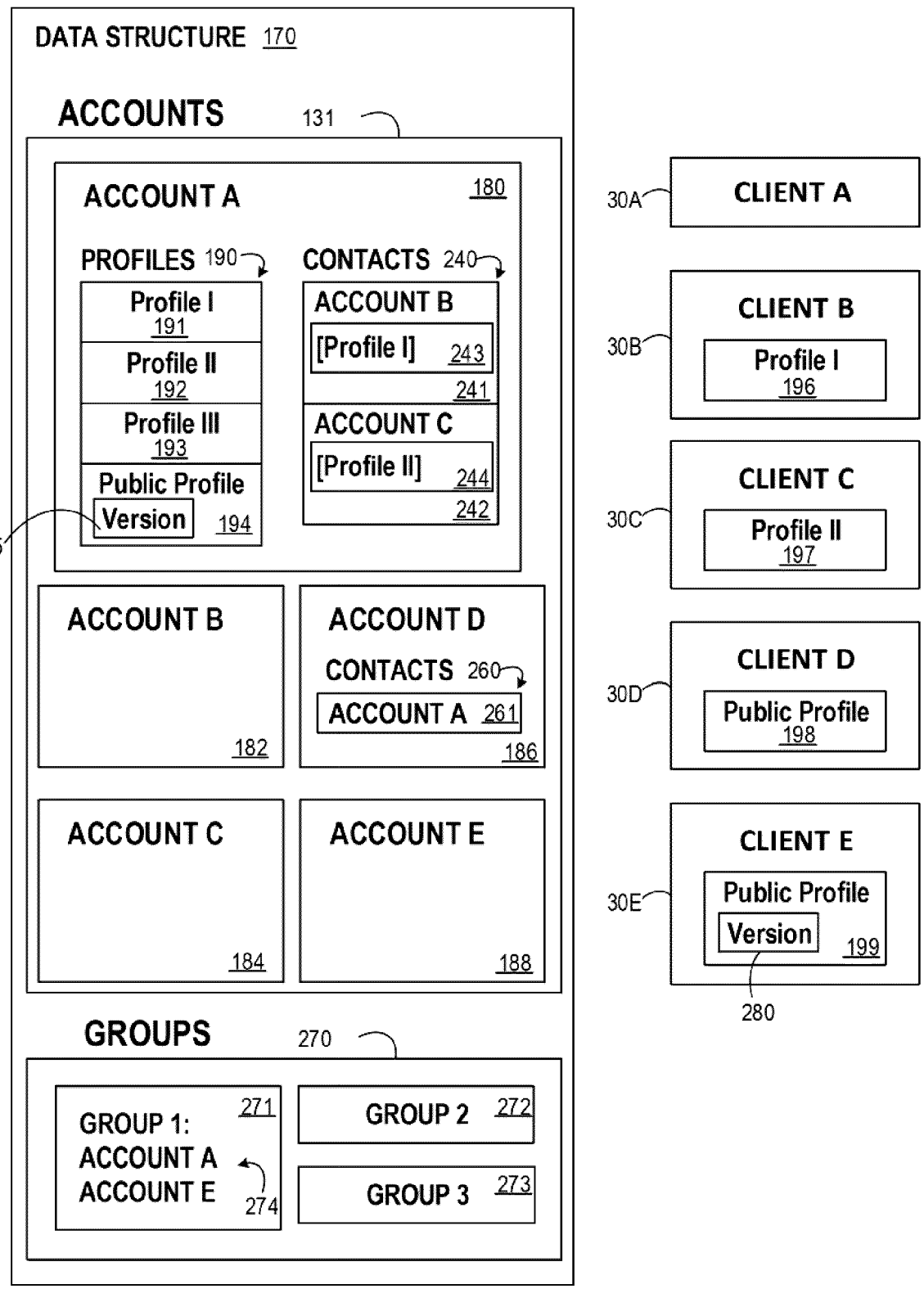
FIG. 3 is a block diagram illustrating schematically exemplary data relationships of a data structure of the asynchronous messaging server.

FIG. 3 shows a block diagram of a data structure 170 which is a non-limiting example of a schematic relationship of the information stored in the data structure 120. As will be appreciated by persons skilled in the art, such schematic relationship may be achieved in a number of different ways in the data structure 120. For example, the account database 130 may store entries defining or associated with a number of user accounts 131, including by way of non-limiting example Account A 180, Account B 182, Account C 184, Account D 186, and Account E 188. Each account 131 may store information associated with and identifying each corresponding client 30, such as clients 30A, 30B, 30C, 30D, and 30E, respectively. The user profiles 140 database may store profile information, including profile specifications, associated with and identifying the corresponding accounts. For example, Account A 180 may have four different profiles 190, which may include Profile I 191, Profile II 192, Profile III 193, and a Public Profile 194, which may include a version number 195 discussed further below. The different profiles 191, 192, 193, 194 may each be different from the others, and in particular the respective profile specifications may be different. For example, Profile I 191 may be a family profile which may contain identity information which is appropriate to a family contact configuration; Profile II 192 may be a friend profile which may contain identity information which is appropriate to a friend contact configuration; Profile III 193 may be a work profile which may contain identity information which is appropriate to business and coworker contact configuration; and the Public Profile 194 may contain identity information which is appropriate to other configurations that do not fall under other configurations or have no prior relationship with the user account. In this way, the different profiles 190 may be associated with a different category (e.g. family, friends, work, public) which relates to the nature of the information presented or accessible in the profile.

Figure 4:
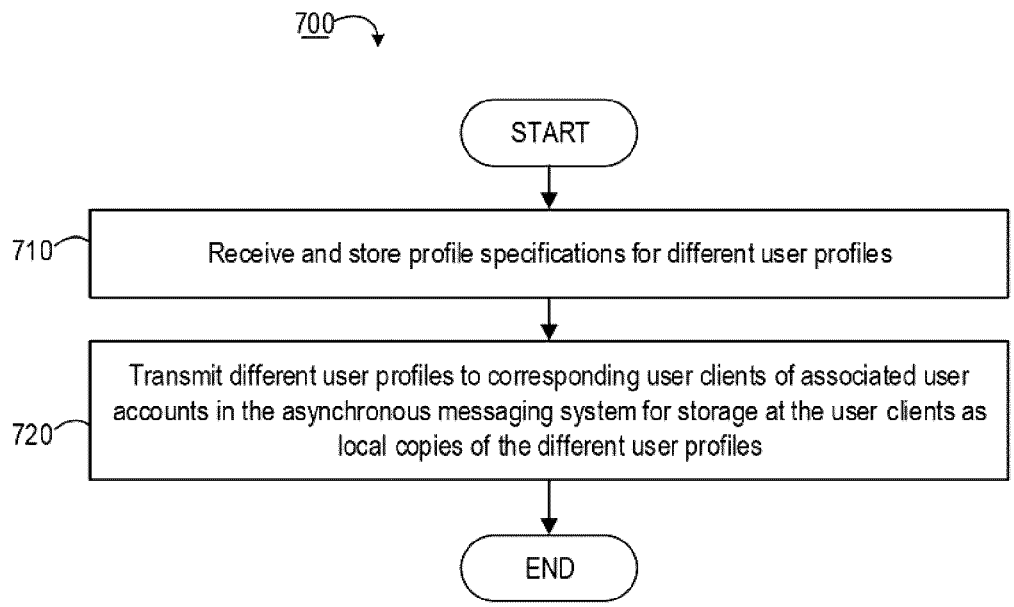
FIG. 4 is a flowchart of a general process of transmitting different profiles to different receiving user clients.

Thus, as shown in FIG. 4, in a general method 700 embodying the present techniques, the server 20 may receive and store profile specifications, which may be in association with an authentication to a particular user account, for different user profiles (step 710), and may transmit the different user profiles to corresponding different user clients 30 of different associated user accounts in the asynchronous messaging system for storage at the user clients 30 as local copies of the different user profiles (step 720). As illustrated in FIG. 3, by the methods described herein, other accounts, including Account B 182, Account C 184, Account D 186, and Account E 188, may receive at respective different user clients 30B, 30C, 30D, 30E associated with those accounts, respectively different ones of the plurality of profiles 190 of Account A 180, for storage at that client as a local copy of the profile for display at that client as part of use of the asynchronous messing system. For example, Client B 30B may receive and store a local copy 196 of Profile I 191, Client C 30C may receive and store a local copy 197 of Profile II 192, Client D 300 may receive and store a local copy 198 of the Public Profile 194, and Client E 30E may receive and store a local copy 199 of the Public Profile 194. Each asynchronous messaging client 30 may provide a user interface for viewing its respective local copy of the corresponding Account A profile offline and identify Account A with the received profile information. Therefore, a user of client 30B of Account B 182 may see and identify Account A 180 with the received Profile I 191 information (e.g. a family profile), a user of client 30C of Account C 184 may see and identify Account A 180 with the received Profile II 192 information (e.g. a friend profile), and respective users of client 30D of Account D 184 and client 30E of Account E 188 may see and identify Account A 180 with the received Public Profile 194 information. Each asynchronous messaging client 30 may continue to see and identify Account A 180 with the received profile information until it receives another message instruction to update or change the profile information of Account A 180.

The present techniques may include a number of different methods by which multiple different profiles received and stored in association with a particular user account are respectively associated with other user accounts and/or are transmitted to the clients associated with other user accounts for storage as local copies of such multiple different profiles.

Figure 5:
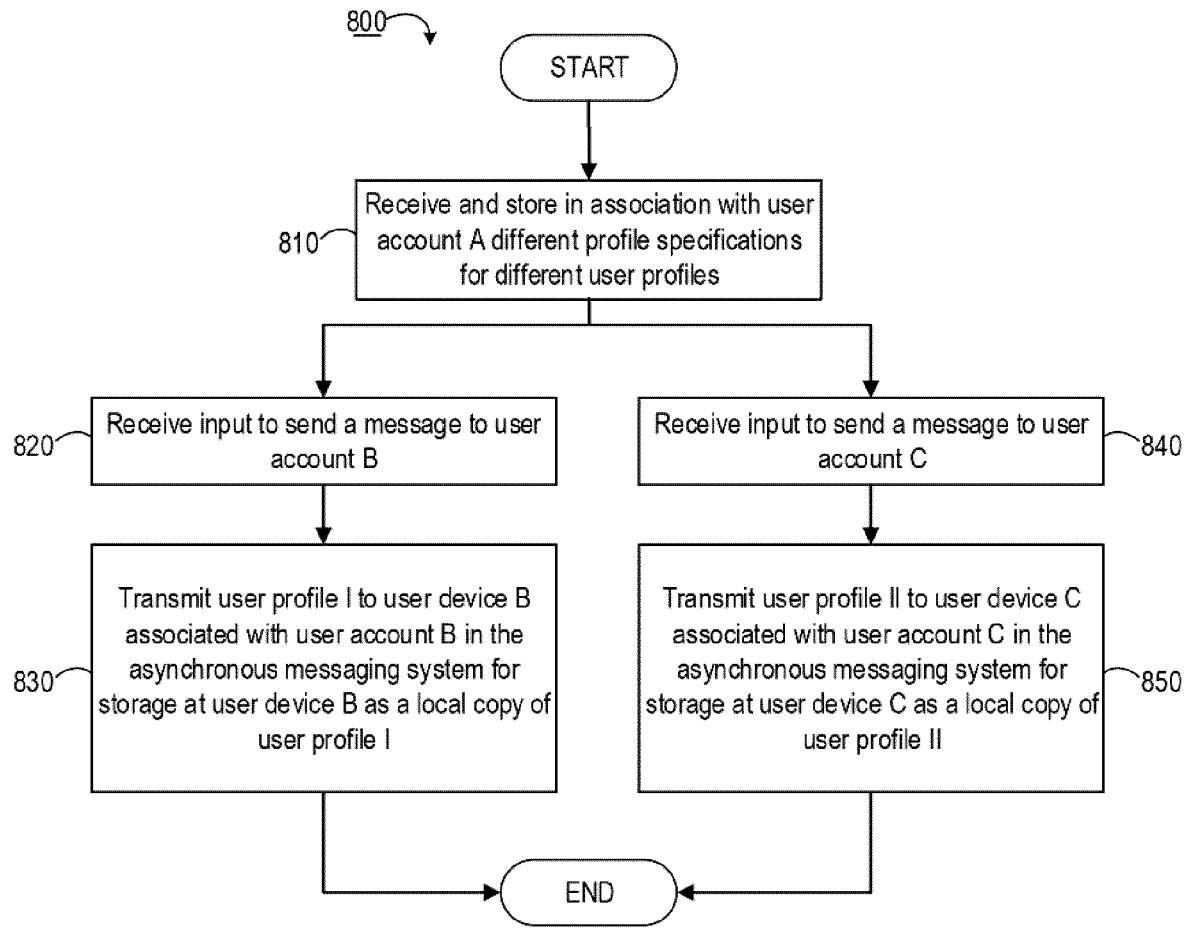
FIG. 5 is a flowchart of a process of transmitting different profiles to different receiving user clients when messages are sent to those clients.

For example, as shown in the method 800 of FIG. 5, once the server 20 has received and stored in association with a user account different profile specifications for respective different user profiles, the different profiles may be sent or made available to different other user clients when messages are sent by the first user to the corresponding other user accounts. For example, the server 20 may receive and store in association with user account A different profile specifications for different user profiles (step 810), such as Profile I 191 and Profile II 192 as shown in FIG. 3. The server 20 may then receive an input in association with authentication to Account A 180 to send a message to Account B 182 (step 820). The server 20 may then transmit Profile 191 to Client B 30B associated with Account B 182 in the system 10 for storage at Client B 30B as a local copy 196 of Profile I 191 (step 830). Similarly, the server 20 may receive an input in association with authentication to Account A 180 to send a message to Account C 184 (step 840). The server 20 may then transmit Profile II 192 to Client C 30C associated with Account C 184 in the system 10 for storage at Client C 30C as a local copy 197 of Profile II 192 (step 850). The selection of Profile I 191 by the server 20 for transmission to Client B 30B may be responsive to a manual selection by a user of Account A 180 (e.g. using Client A 30A) to include in association with the message an identification of Profile 191 in order that a copy of Profile I 191 is sent to the Client B 30B associated with Account B 182. Alternatively, the selection of Profile I 191 by the server 20 may be responsive to a determination by the server 20 that the data structure 170 contains in the contact list 240 of Account A an entry 241 identifying Account B 182 and containing an identification 243 of Profile I 191 in association with Account B 182. The selection of Profile II 192 by the server 20 for transmission to Client C 30C may be responsive to a manual selection by a user of Account A 180 (e.g. using Client A 30A) to include in association with the message an identification of Profile II 192 so that a copy of Profile II 192 is sent to Client C 30C of Account C 184. Alternatively, the selection of Profile II 192 by the server 20 may be responsive to a determination by the server 20 that the data structure 170 contains in the contact list 240 of Account A 180 an entry 242 identifying Account C 184 and containing an identification 244 of Profile II 192 in association with Account C 184.

The system 20 may be configured to select a profile to send to a receiving client 30 by any other suitable method. For example, the data structure 170 may store in association with each profile of a particular account a weighting value, and when the server receives an input from a user of the account, such as from a client associated with that account, to send a message to another account, the server 20 may select randomly one of the profiles stored in association with of the sender's account, and such random selection may be weighted by the stored weighting values.

A user of an asynchronous messaging client 30 may be required to register prior to establishing connectivity to the asynchronous messaging server 20. The user of the asynchronous messaging client 30 may establish a connection to the asynchronous messaging server 20 for registration. The user of the asynchronous messaging client 30 may send registration identifications such as an MSISDN, a unique device ID (UDID), and/or a push notification identification. Once the registration identifications are received, the asynchronous messaging server 20 may create an asynchronous messaging account and return an account identifier and secret PIN, which may be termed asynchronous messaging client credentials, to the asynchronous messaging client 30, which may be stored on a computer readable storage medium at the asynchronous messaging client 30. In order to complete the registration process, the asynchronous messaging client 30 may send multiple profiles for association with the account to the asynchronous messaging server 20. The asynchronous messaging client 30 may also send a list of contact MSISDNs to the asynchronous messaging server 20. The asynchronous messaging server 20 may validate the list of contact MSISDNs and return to the asynchronous messaging client 30 identifications of the available associated registered asynchronous accounts and their profiles. The asynchronous messaging client 30 may store the MSISDNs and their associated asynchronous accounts and their profile data information, collectively known as the contact list. The asynchronous messaging client 30 may store the contact list on a computer readable storage medium.

Figure 6:
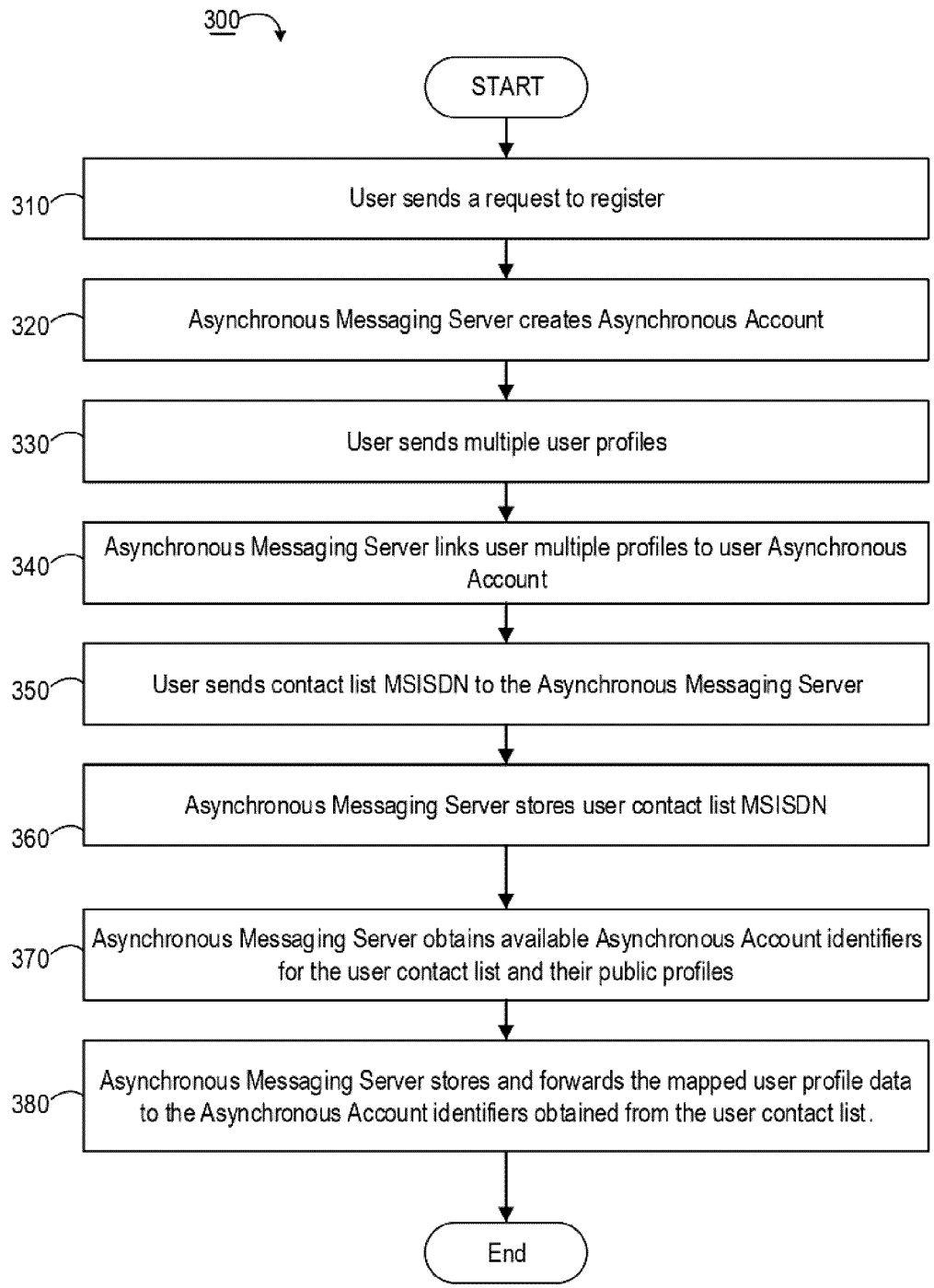
FIG. 6 is a flowchart of a process of new asynchronous account registration with multiple profiles.

Thus, FIG. 6 illustrates a process 300 of a new asynchronous account registration with multiple profiles. In particular, in some embodiments, the plurality of user profiles is transmitted at a time of adding a new receiving account identification list, or the plurality of user profiles is transmitted at a time of changing the user profile assignment to the plurality of receiving account identification lists. In the example shown, a user may use the asynchronous messaging client 30 to send a request for registration (step 310). The asynchronous messaging server 20 may create an asynchronous account and return to the asynchronous messaging client 30 an asynchronous account identifier along with a secret PIN that is known as asynchronous messaging client credentials data information (step 320). The asynchronous messaging client 30 may store the asynchronous messaging client credentials data information for subsequent authentications. The asynchronous messaging client 30 may connect to and authenticate with the asynchronous messaging server 20 and send multiple profile information to complete the registration (step 330). The asynchronous messaging server 20 may store the user's profiles and link them to the authenticated user asynchronous account (step 340). The asynchronous messaging client 30 may send a list of contact identifiers, e.g. MSISDNs or other mobile contact numbers, using the user client 30 to the asynchronous messaging server 20 (step 350). The asynchronous messaging server 20 may store the received MSISDNs and link them to the authenticated user asynchronous account identifier (step 360). The asynchronous messaging server 20 may check the received MSISDNs and look up their asynchronous account identifiers, and return to the asynchronous messaging client 30 the received MSISDNs along with their associated asynchronous account identifiers and associated with their public profiles data information (step 370). The asynchronous messaging client 30 may store the MSISDNs and their associated asynchronous account identifiers and their profiles data information, collectively known as the contact list. The asynchronous messaging server 20 may check and obtain a list of all asynchronous accounts that declare the newly registered asynchronous account within their contact lists. The asynchronous messaging server may push to the obtained asynchronous accounts list a message instruction with the new asynchronous account identifier and its public profile. This operation is known as reverse contact list lookup. The message instruction may be stored and forwarded for the reverse contact asynchronous account as soon as it becomes online. At the end of this operation process, the asynchronous messaging server may transmit the new asynchronous user profiles to its own contact list, and transmit the contact list profiles to the new asynchronous account (step 380). The example shown illustrates how multiple profiles can be distributed and managed within an asynchronous messaging system.

As discussed above, the user contact lists 150 database may store information identifying contacts of each user account, or in other words which identifies other user accounts. As shown in FIG. 3, by way of example, the data structure 170 may store a contact list 240 for Account A 180 which includes contact entries 241, 242 which contain information identifying Account B 182 and Account C 184, respectively. Contact entry 241 which identifies Account B 182 may contain an identification 243 of a profile, namely Profile I 191, for association with Account B 182, and contact entry 242 may contain an identification 244 of a different profile, namely Profile II 192, for association with Account C 184. Alternatively, the data structure 170 may associate different other accounts with corresponding different profiles indirectly. For example, the contact list of Account A 180 may associate with or identify in one or more of the contact entries a category, and the data structure 170 may store in connection with each such category a corresponding profile identification. Thus, for example, each of the contact entries of Account A 180 may include an identification of, or be otherwise associated with, one of the categories family, friends, work, and public. In such case, the data structure 170 may store for each such category an identification of, or otherwise associate with, a corresponding profile, for example Profile I 191, Profile II 192, Profile III 193, and the Public Profile 194, respectively, which may be respectively a family profile, a friends profile, a work profile, and a public profile, as described above. Other combinations and alternatives are possible.

The asynchronous messaging client 30A of the user of Account A 180 may transmit the contact list 240 along with the associated profile mapping to the asynchronous messaging server 20. The asynchronous messaging server 20 may send a message instruction to all asynchronous accounts in the contact list 240 of Account A 180 to update any locally-stored copy of the corresponding profile of Account A with the corresponding profile information. The asynchronous messaging server 20 may store and forward the message instruction and deliver it as soon the receiving asynchronous account is online. For example Account B 182 may receive Profile I 191 of account A 180, and Account C 184 may receive Profile II 192 of Account A 180. The asynchronous messaging clients 30B, 30C of Account B 182 and Account C 184 respectively, may store the received profile information of Account A 180 on a computer readable storage medium of user devices included in the clients 30B, 30C respectively associated with those accounts.

Figure 7:
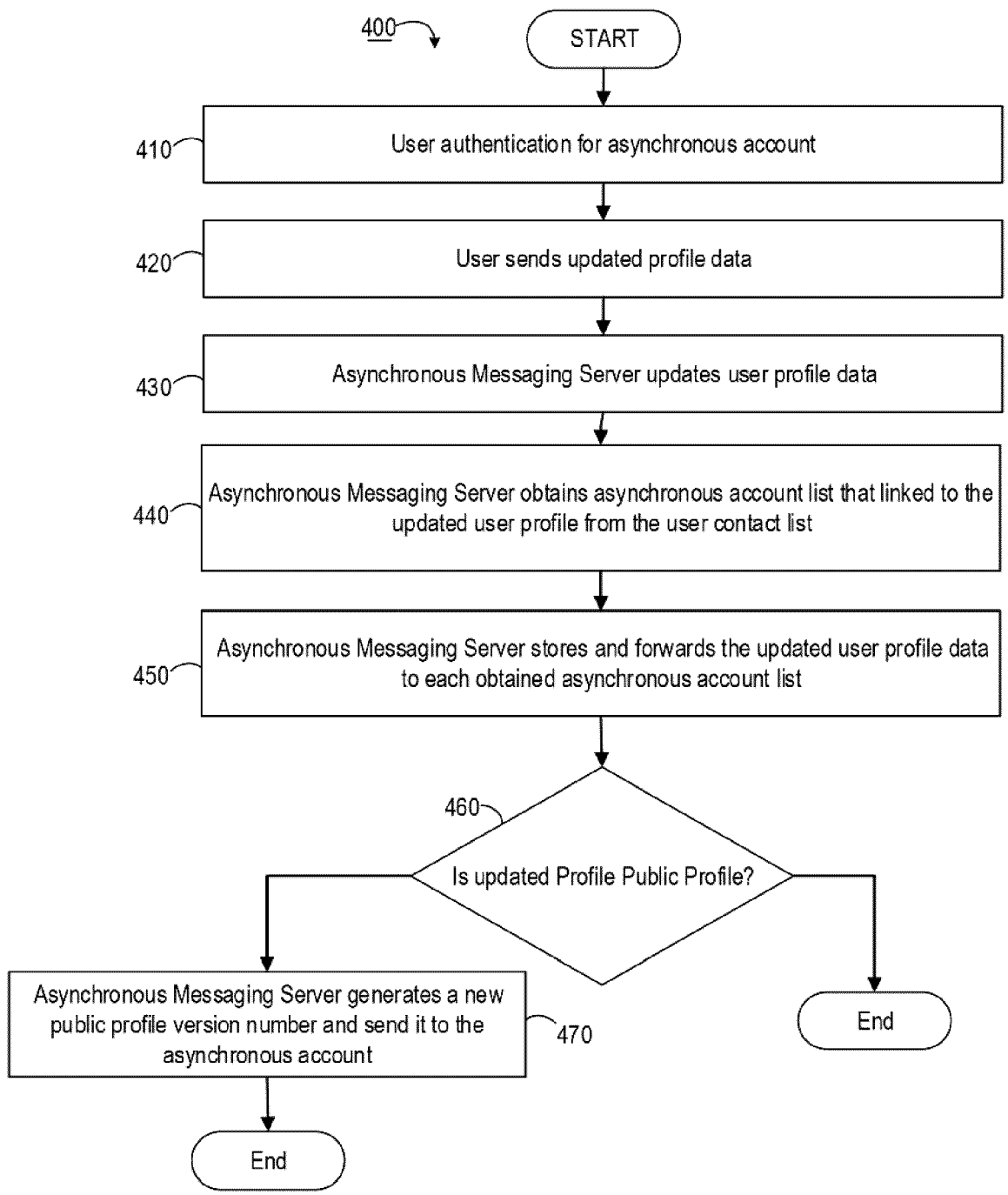
FIG. 7 is a flowchart of a process of an asynchronous account updating its own profile.

FIG. 7 illustrates a process 400 of an asynchronous account updating its own profile. In the example shown, a user uses the asynchronous messaging client 30 to update its own profile. The asynchronous messaging client 30 may authenticate to the asynchronous messaging server 20 (step 410). The asynchronous messaging client 30 may provide a user interface to update its own multiple profiles. The asynchronous messaging client 30 may send the updated profiles to the asynchronous messaging server 20 (step 420). The asynchronous messaging server 20 may store the updated profile (step 430). The asynchronous messaging server 20 may look up and obtain a list of accounts linked to the updated profile within the contact list (step 440) and push a message instruction to the obtained asynchronous accounts list with the asynchronous account identifier and its updated profile (step 450). This operation is known as contact list lookup. The message instruction may be stored and forwarded for each account in the contact list account as soon as it becomes online. If the updated profile is a public profile (decision 460), the asynchronous messaging server 20 may generate a tracking version number for the updated public profile; the asynchronous messaging server 20 may return the public profile version number to the asynchronous messaging client 30 to store; the asynchronous messaging server 20 may send the stored public profile version number with all messages sent from the asynchronous messaging client 30 to a receiving account (step 470). As soon as the receiver receives a message, it may use the associated public profile version number of the sending party to compare it with a stored value. If the public profile is outdated, the receiver may request and receive the updated public profile of the sending party.

The result of this process may be that the asynchronous messaging server 20 transmits the updated asynchronous account profile to its own contact list, while other accounts with no relationship to the asynchronous account are updated at a time of receipt of a new message from the asynchronous account. The example shown illustrates how updated multiple profiles can be distributed and managed within asynchronous messaging system.

Figure 8:
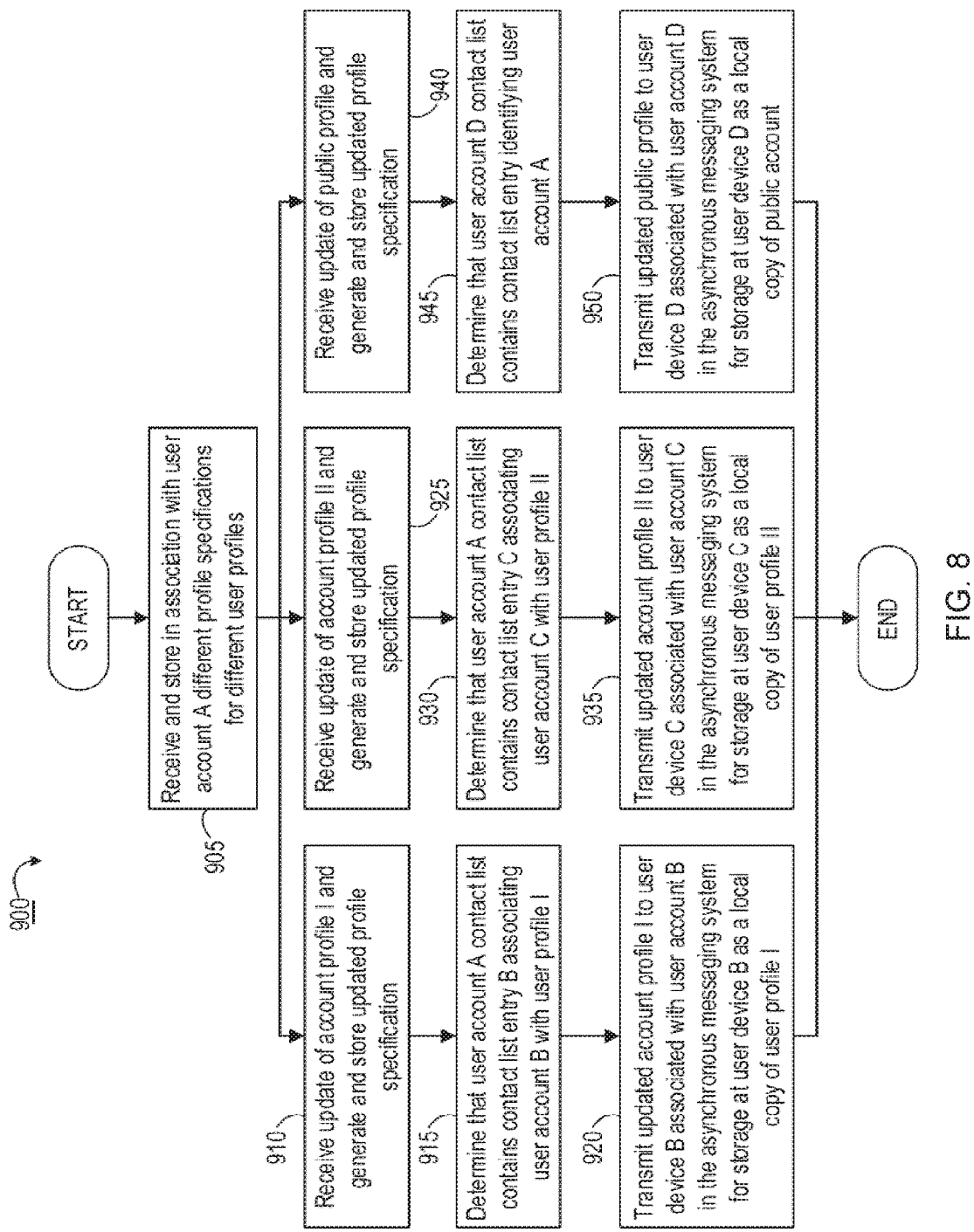
FIG. 8 is a flowchart of a process of transmitting different profiles to different receiving user clients based on contact list lookups and reverse contact list lookups.

Thus, as shown in the method 900 of FIG. 8, once the server 20 has received and stored in association with a user account different profile specifications for respective different account profiles, the different profiles may be sent or made available to different other user clients when the first user's contact list identifies the other users, or vice versa. For example, the server 20 may receive and store in association with user account A 180 different profile specifications for different account profiles (step 905), such as Profile I 191 and Profile II 192 as shown in FIG. 3. The system 20 may receive an update of Profile I 191, which may include its original creation, and generate and store an updated profile specification (step 910). The server 20 may then determine that the contact list 240 of Account A 180 contains a contact list entry 241 that identifies Account B 182 and includes an identification 243 of Profile I 191 for association with Account B 182 (step 915). Responsive to such determination, the server 20 may transmit the updated Profile I 191 to Client B 30B associated with Account B 182 for storage at Client B 30B as a local copy 196 of Profile I 191 (step 920). Separately, or in the implementation and operation of the same system 10, the server 20 may receive an update of Profile II 192, which may include its original creation, and generate and store an updated profile specification (step 925). The server 20 may then determine that the contact list 240 of Account A 1 80 contains a contact list entry 242 that identifies Account C 184 and includes an identification 244 of Profile II 192 for association with Account C 184 (step 930). Responsive to such determination, the server 20 may transmit the updated Profile II 192 to Client C 30C associated with Account C 184 for storage at Client C 30C as a local copy 197 of Profile II 192 (step 935). Separately, or in the implementation and operation of the same system 10, the server 20 may receive an update of the Public Profile 194, which may include its original creation, and generate and store an updated profile specification (step 940). The server 20 may then determine that the contact list 260 of Account D 186 contains a contact list entry 261 that identifies Account A 180 (step 945). Optionally, the server 20 may first determine that the contact list 240 of Account A 180 is free of any entry identifying Account D 186. Responsive to such determination, or determinations, as the case may be, the server 20 may transmit the updated Public Profile 194 to Client D 30D associated with Account D 186 for storage at Client D 30D as a local copy 198 of the Public Profile 194 (step 950). In other words, when the contact list of another account identifies Account A 180, the system may transmit to the client associated with that other account a copy of the Public Profile 194 of Account A 180 for storage as a local copy of the Public Profile 194 at that client. In this way, the Public Profile 194 of Account A 180 may serve as a default profile to be transmitted to the clients of other accounts when Account A 180 does not identify such other accounts in its contacts list or otherwise does not identify one of its profiles for association with and receipt by that other account.

When neither of the contact lists of two different accounts contains any entry identifying the other account, the two accounts may be said to be unrelated. With reference to FIG. 3, and by way of non-limiting example, Account E 188 contains no contact list entry which identifies Account 180, nor does the contact list 240 of Account A 180 contain an entry identifying Account E 188, and therefore these two accounts are unrelated. In such case, a copy of a profile of the first account may be transmitted to a client associated with the second account only when a message is sent from the first account to the second account. In such case, the profile may be a default profile such as the Public Profile.

In some cases, the message from the first account is addressed to the second account not directly, but indirectly. In other words, in some cases, the user of the first account does not address the message explicitly to the second account. One situation in which this may occur is where the system 10 defines and operates account groups, wherein multiple accounts of the system 10 may be identified as belonging to a particular group, and messages sent to that group are propagated to all members of the group, excepting the sender. Thus, as shown in FIG. 3, the data structure 170 may define groups 270, and in particular corresponding group definitions may be stored in the groups database 160 as discussed above. By way of non-limiting example, the groups list 270 may define a Group 1 271 which includes identifiers 274 which identify Account A 180 and Account E 188 as belonging to Group 1 271. The data structure 170 may identify yet further accounts as belonging to Group 1, and moreover may further define additional groups such as Group 2 272 and Group 3 273. As shown in FIG. 3, neither Account A 180 nor Account E 188 contains a contact list entry identifying the other account, and thus the two accounts may be considered to be unrelated except for the common membership of the two accounts in Group 1 271.

Although the server 20 may be so configured that when the Public Profile 194, or another default profile, of Account A 180 is created or updated, it is pushed to all members of any group 270 to which Account A 180 belongs, such a configuration may not be desirable when the number of members of such groups is large and the resulting network traffic would likewise be large. In such case, a different mechanism to update local copies of the Public Profile 194 may be preferable.

Figure 9:
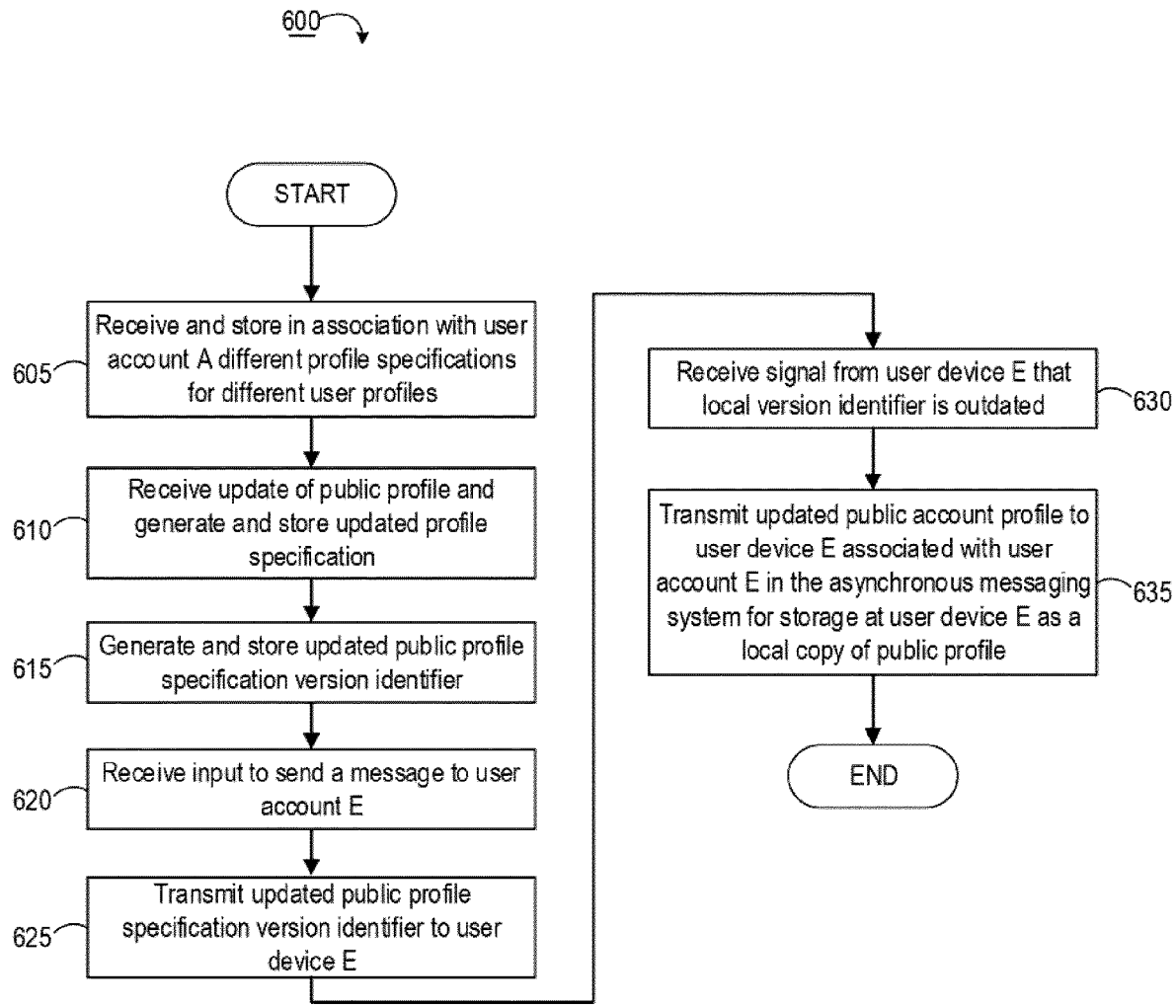
FIG. 9 is a flowchart of a process of transmitting an updated public profile to a user client only when outdated.

Thus, as shown in the method 600 of FIG. 9, the server 20 may receive and store in association with a first user account, for example Account A 180, different profile specifications for different account profiles 190 (step 605). For example, the different account profiles may include the Public Profile 194. The system 20 may then receive an update of the Public Profile 194, which may include its creation, and generate and store an updated profile specification (step 610). The system 20 may then generate and store an updated public profile specification version identifier 195 (step 615). The system 20 may then receive an input, which may be from Account A 180, to send a message to another user account, which may be Account E 188 (step 620). As shown in FIG. 3, Account A 180 and Account E 188 may be unrelated, in that neither account has a contact list containing an entry identifying the other account. As also shown in FIG. 3, however, the data structure 170 may define Group 1 271 which contains identifiers identifying Account A 180 and Account E 188 as belonging to Group 1 271. In such case, the input from Account A 180 to send a message to Account E 188 may identify Group 1 271, in other words to send the message to all accounts which are members of Group 1 271, thereby indirectly identifying Account E 188 to receive the message. The server 20 may then transmit the updated public profile specification version identifier 195 to Client E 30E associated with Account E 188 (step 625). Client E 30E may then determine whether any local public profile specification version identifier 280 for the Public Profile copy 299 stored locally at Client E 30E matches the received updated public profile specification version identifier 195. If it does not, Client 30E may send to the server 20 a signal, which the server 20 receives, indicating that the local version identifier 280 stored at Client 30E is updated (step 630). In such case, which may be only in such case, the server 20 may transmit the updated public profile 194 to Client E 30E associated with Account E 186 for storage at Client E 30E as a local copy 199 of the Public Profile 194. Client E 30E may also update the local specification version identifier 280 associated with such local copy 199. Otherwise, the server 20 may refrain from transmitting the public profile 194, if the local version identifier 280 indicates that the local copy 199 of the Public Profile 194 is up-to-date. Optionally, the server 20 may first determine that the contact list 240 of Account A 180 is free of any entry identifying Account E 188, and may also determine that the contact list of Account E 188 is free of any entry identifying Account A 180, as otherwise the updated profile may be pushed to Client E 30E automatically by the methods 900 described above.

Although the above method 600 is described for use with a public profile, and particularly where the public profile is used as a default profile where the related account and receipt account are unrelated, it will be understood that the technique may be used in connection with any of the different methods described herein. For example, where an account's contact list contains an entry identifying another account, as well as a profile of the first account in association with that other account, the server 20 may perform substantially method 600 when providing or updating the local copy of the profile at the client associated with the other account. In other words, the server may maintain a version identifier associated with the profile, send the version identifier to the recipient client, and transmit the profile only if a signal is received from the recipient client that its local version identifier indicates that its local copy of the profile is outdated or is otherwise different. A similar method may be applied where a profile is transmitted responsive to a reverse lookup, as described above.

The foregoing techniques provide a user of an asynchronous messaging system the ability to create and store multiple different profiles for use with different categories of contacts and other users of the asynchronous messaging system. In this way, the user may select the information which other particular categories of users, or individual users, which receive and see in association with use of the messaging system, and in this way the user may select information appropriate to that other user. This capability enables the user to protect his privacy, for example from users in a work category, and at the same time share freely information appropriate to other users in other categories, for example in a family or friends category. The use of groups containing large numbers of users, and the problem of increased network traffic association with the addition, update, and propagation of profiles is addressed by the use of version identifiers whereby recipient local copies of another user's profile are updated only if outdated, thereby reducing the network traffic that would result from pushing the entire profile immediately to all members of the group.

In the preceding description, for purposes of explanation, numerous details are set forth in order to provide a thorough understanding of the embodiments. However, it will be apparent to one skilled in the art that these specific details may not be required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art.

In some instances, well-known hardware and software components, modules, and functions are shown in block diagram form in order not to obscure the invention. For example, specific details are not provided as to whether the embodiments described herein are implemented as a software routine, hardware circuit, firmware, or a combination thereof.

Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks.

The scope of the claims should not be limited by the particular embodiments set forth herein, but should be construed in a manner consistent with the specification as a whole.

What is claimed is:

1. A method of managing a plurality of user profiles associated with a first user account in an asynchronous messaging system, the method comprising:
   a) receiving and storing at a server of an asynchronous messaging system in association with authentication to a first user account respective profile specifications for a plurality of user profiles associated with the first user account, the plurality of user profiles comprising a first user profile and a second user profile different from the first user profile;
   b) receiving at the server a group definition identifying a second user account in the asynchronous messaging system and a third user account in the asynchronous messaging system;
   c) receiving at the server in association with authentication to the first user account an input identifying the first user profile and the second user account in the asynchronous messaging system, and, in response, generating and storing at the server in a first user contact list associated with the first user account a second user account entry identifying the second user account in association with the first user profile;
   d) receiving at the server in association with authentication to the first user account an update of a profile specification of the second user profile and, in response, generating and storing an updated profile specification of the second user profile, and generating and storing at the server in association with the second user profile an updated profile specification version identifier of the second user profile;

e) receiving at the server an input to send a message from the first user account to the second user account and to the third user account, wherein the input received at the server from the first user account identifies a group associated with the group definition, and determining that the group definition identifies the second user account and the third user account;
f) responsive to process e), transmitting by the server the first user profile to a first user client associated with the second user account for storage at the first user client as a local copy of the first user profile;
g) responsive to process e):
   A) determining by the server that the first user contact list associated with the first user account is free of any entry identifying the third user account; and
   B) determining by the server that a second user contact list associated with the third user account is free of any entry identifying the first user account;
h) responsive to process g), transmitting by the server to a second user client associated with the third user account the updated profile specification version identifier;
i) receiving at the server a signal from the second user client indicating that a local profile specification version identifier associated with a local copy of the second user profile stored at the second user client is different from the updated profile specification version identifier; and
j) responsive to process i), transmitting by the server the second user profile to a second user client associated with the third user account for storage at the second user client as a local copy of the second user profile, wherein the second user profile transmitted to the second user client comprises the updated profile specification of the second user profile.

2. The method according to claim 1 further comprising:
k) receiving at the server in association with authentication to the first user account an update of a profile specification of the first user profile and, in response to the receiving of process k), generating and storing at the server an updated profile specification of the first user profile;
l) determining by the server that the first user contact list associated with the first user account contains the second user account entry identifying the second user account in association with the first user profile; and
m) responsive to processes k) and l), transmitting by the server the first user profile to the first user client associated with the second user account for storage at the first user client as a local copy of the first user profile, wherein the first user profile transmitted to the first user client comprises the updated profile specification of the first user profile.

3. The method according to claim 1 further comprising:
k) receiving at the server in association with authentication to the first user account an update of a profile specification of the second user profile and, in response to the receiving of process k), generating and storing at the server an updated profile specification of the second user profile;
l) determining by the server that a third user contact list associated with a fourth user account in the asynchronous messaging system contains a first user account entry identifying the first user account,
m) responsive to processes k) and l), transmitting by the server the second user profile to a third user client associated with the fourth user account for storage at the third user client as a local copy of the second user profile, wherein the second user profile transmitted to the third user client comprises the updated profile specification of the second user profile.

4. The method according to claim 3, wherein the first user contact list associated with the first user account is free of any entry identifying the fourth user account.

5. The method according to claim 3, wherein the third user contact list of the fourth user account is free of any entry identifying the first user profile.

6. The method according to claim 1, wherein process g)B) is performed responsive to process g)A).

7. The method according to claim 1, wherein the first user contact list of the first user account is free of any entry identifying the second user profile.

8. The method according to claim 1 further comprising:
k) receiving at the server in association with authentication to the first user account an update of the profile specification of the second user profile and, in response, generating and storing by the server an updated profile specification of the second user profile;
l) determining by the server that the first user contact list associated with the first user account contains a fourth user account entry identifying a fourth user account in the asynchronous messaging system in association with the second user profile,
m) responsive to processes k) and l), transmitting by the server the second user profile to a third user client associated with the fourth user account for storage at the third user client as a local copy of the second user profile, wherein the second user profile transmitted to the second user client comprises the updated profile specification of the second user profile.

9. The method according to claim 1, wherein each of the plurality of user profiles comprises an image, an animated image, a video, text, or a combination thereof.

10. The method according to claim 1, wherein each of the plurality of user profiles comprises only one of an image, an animated image, a video, or text.

11. A system for managing a plurality of user profiles associated with a first user account in an asynchronous messaging system, the system comprising:
a processor;
a communications interface; and
a non-transient computer-readable medium encoding computer-executable instructions executable by the processor to perform the following method using the communications interface:
   a) receiving and storing at a server of an asynchronous messaging system in association with authentication to a first user account respective profile specifications for a plurality of user profiles associated with the first user account, the plurality of user profiles comprising a first user profile and a second user profile different from the first user profile;
   b) receiving at the server a group definition identifying a second user account in the asynchronous messaging system and a third user account in the asynchronous messaging system;
   c) receiving at the server in association with authentication to the first user account an input identifying the first user profile and the second user account in the asynchronous messaging system, and, in response, generating and storing at the server in a first user contact list associated with the first user account a second user account entry identifying the second user account in association with the first user profile;

d) receiving at the server in association with authentication to the first user account an update of a profile specification of the second user profile and, in response, generating and storing an updated profile specification of the second user profile, and generating and storing at the server in association with the second user profile an updated profile specification version identifier of the second user profile;

e) receiving at the server an input to send a message from the first user account to the second user account and to the third user account, wherein the input received at the server from the first user account identifies a group associated with the group definition, and determining that the group definition identifies the second user account and the third user account;

f) responsive to process e), transmitting by the server the first user profile to a first user client associated with the second user account for storage at the first user client as a local copy of the first user profile;

g) responsive to process e):
  A) determining by the server that the first user contact list associated with the first user account is free of any entry identifying the third user account; and
  B) determining by the server that a second user contact list associated with the third user account is free of any entry identifying the first user account;

h) responsive to process g), transmitting by the server to a second user client associated with the third user account the updated profile specification version identifier;

i) receiving at the server a signal from the second user client indicating that a local profile specification version identifier associated with a local copy of the second user profile stored at the second user client is different from the updated profile specification version identifier; and j) responsive to process i), transmitting by the server the second user profile to a second user client associated with the third user account for storage at the second user client as a local copy of the second user profile, wherein the second user profile transmitted in the second user client comprises the updated profile specification of the second user profile.

12. A non-transient computer-readable medium encoding computer-executable instructions executable by a processor to perform the following using a communications interface:

a) receiving and storing at a server of an asynchronous messaging system in association with authentication to a first user account respective profile specifications for a plurality of user profiles associated with the first user account, the plurality of user profiles comprising a first user profile and a second user profile different from the first user profile;

b) receiving at the server a group definition identifying a second user account in the asynchronous messaging system and a third user account in the asynchronous messaging system;

c) receiving at the server in association with authentication to the first user account an input identifying the first user profile and the second user account in the asynchronous messaging system, and, in response, generating and storing at the server in a first user contact list associated with the first user account a second user account entry identifying the second user account in association with the first user profile;

d) receiving at the server in association with authentication to the first user account an update of a profile specification of the second user profile and, in response, generating and storing an updated profile specification of the second user profile, and generating and storing at the server in association with the second user profile an updated profile specification version identifier of the second user profile;

e) receiving at the server an input to send a message from the first user account to the second user account and to the third user account, wherein the input received at the server from the first user account identifies a group associated with the group definition, and determining that the group definition identifies the second user account and the third user account;

f) responsive to process e), transmitting by the server the first user profile to a first user client associated with the second user account system for storage at the first user client as a local copy of the first user profile;

g) responsive to process e):
  A) determining by the server that the first user contact list associated with the first user account is free of any entry identifying the third user account and
  B) determining by the server that a second user contact list associated with the third user account is free of any entry identifying the first user account;

h) responsive to process g), transmitting by the server to a second user client associated with the third user account the updated profile specification version identifier;

i) receiving at the server a signal from the second user client indicating that a local profile specification version identifier associated with a local copy of the second user profile stored at the second user client is different from the updated profile specification version identifier; and j) responsive to process i), transmitting by the server the second user profile to a second user client associated with the third user account for storage at the second user client as a local copy of the second user profile, wherein the second user profile transmitted to the second user client comprises the updated profile specification of the second user profile.

* * * * *